INVENTOR.
RUDOLF PAULUS

United States Patent Office 3,426,357
Patented Feb. 4, 1969

3,426,357
EXPOSURE REGULATING CIRCUIT ARRANGEMENT FOR A COPYING MACHINE
Rudolf Paulus, Munich, Germany, assignor to Agfa-Gevaert Aktiengesellschaft, Leverkusen, Germany
Filed Mar. 2, 1966, Ser. No. 531,237
Claims priority, application Germany, Mar. 10, 1965,
A 48,598
U.S. Cl. 355—68    9 Claims
Int. Cl. G03b 27/78, 27/02

ABSTRACT OF THE DISCLOSURE

A photoelectric transducer produces an electrical signal corresponding in magnitude to the intensity of light applied to copying material. A timer circuit produces an electrical signal as a function of time starting simultaneously with the start of illumination of the copying material. A first and second logarithmic amplifier respectively operate upon the timing signal and the light intensity signal and variable resistors are provided at the respective outputs of the logarithmic amplifiers for allowing multiplication of each output by a coefficient. An adder combines the so multiplied outputs and the exposure time is terminated in accordance with the magnitude of the resultant sum signal.

---

The present invention relates to an exposure regulating circuit arrangement. More particularly, the invention relates to an exposure regulating circuit arrangement for a copying machine. The exposure regulating circuit arrangement of the present invention provides for over-correction and under-correction relative to the reciprocity principle.

Over-correction and under-correction relative to the reciprocity principle by relatively small amounts is accomplished by known arrangements for correcting the Schwarzschild effect, described, for example, in German Patent No. 1,046,497. In such arrangements, a sufficiently exact over-correction and under-correction in accordance with the equation (1)    $I \cdot t^p = $ Constant is available only for exponents P which deviate from one only to a small extent. In Equation 1, I is the median light intensity impinging upon the copying material and $t$ is the exposure time for the copying material. Furthermore, such arrangements are operable only for a limited switching time period.

There is thus a need for an exposure regulating arrangement which provides a different and unlimited undercorrection of the exposure. Under-correction is defined as the incomplete regulation of differences in light intensity impinging upon the copying material. In other words, negatives which are more dense than a standard negative are exposed for an exposure time which is shorter than would be necessary for providing the value $I \cdot t$, per the reciprocity principle, which was determined upon standardization of the regulating arrangement. Negatives which are less dense than a standard negative are exposed for an exposure time which is longer than would be necessary for providing the value $I \cdot t$. Over-correction is defined as the over-complete regulation of differences in light intensity impinging upon the copying material. In other words, negatives which are more dense than a standard negative are exposed for an exposure time which is longer than would be necessary for providing the value $I \cdot t$, per the reciprocity principle, which was determined upon standardization of the regulating arrangement. Negatives which are less dense than a standard negative are exposed for an exposure time which is shorter than would be necessary for providing the value $I \cdot t$.

Under-correction for relatively great exposure times may be advantageous if the negatives have a median density which does not vary significantly from the density of a standard negative. This is the case where film is exposed in a camera having an automatic exposure setting device and during the copying operation only a portion of the film is utilized for regulating the exposure time. In such case, an exposure time error may occur because of different median densities of the whole picture and of the portion utilized for regulating the exposure time. Such an under-correction is advantageous in the statistically determined median density even if the whole surface of the negative to be copied is utilized to regulate the exposure time in the copying apparatus, and if the portion bearing the picture is anywhere near properly exposed, although the median density of the entire negative deviates from the density of the standard negative. This may occur, for example, in the negatives of a professional photographer who obtains in most cases the proper exposure due to setting of lighting devices.

The principal object of the present invention is to provide a new and improved exposure regulating circuit arrangement for a copying machine. The exposure regulating circuit arrangement of the present invention is of simple structure and functions with reliability, efficiency and accuracy to regulate the exposure time of copying material.

In accordance with the present invention, an exposure time regulating circuit arrangement for regulating the exposure time of copying material comprises means for exposing the copying material to light. A transducer positioned in the light impinging upon the copying material produces an electric signal corresponding in magnitude to the intensity of the light. A timer produces a time dependent electrical signal. An actuator connected to the timer actuates the timer upon the exposure of the copying material to the light. A first logarithmic amplifier connected to the transducer logarithmically amplifies the signal produced by the transducer. A second logarithmic amplifier connected to the timer logarithmically amplifies the signal produced by the timer. A first multiplier connected to the first logarithmic amplifier multiplies the signal amplified by the first logarithmic amplifier by a first coefficient A to produce a first resultant signal. A second multiplier connected to the second logarithmic amplifier multiplies the signal amplified by the second logarithmic amplifier by a second coefficient B different from the first coefficient to produce a second resultant signal. A summation amplifier connected to the first and second multipliers adds the first and second resultant signals to produce a resultant sum signal. A control means connected to the summation amplifier terminates the exposure of the copying material in accordance with the magnitude of the resultant sum signal. The control means includes a comparator and a source of comparison reference voltage connected to the comparator for applying a comparison reference voltage to the comparator. The comparator compares the resultant sum signal with the comparison reference voltage. The means for exposing the copying material to light comprises a light source and an electrical energizing circuit connected to the light source for energizing the light source to produce light. The comparator is coupled to the energizing circuit for deenergizing the energizing circuit to terminate the production of light by the light source.

In accordance with the present invention, each of the first and second logarithmic amplifiers, the summation amplifier and the timer comprises an operational amplifier having an output, an input and a feedback path between the output and the input. Each of these amplifiers has a different feedback component connected in its feedback path which determines its operation as a logarithmic amplifier, a summation amplifier or an integrator suitable for use as a timer.

In order that the present invention may be readily carried into effect, it will now be described with reference to the accompanying drawings, wherein.

Figure 1:
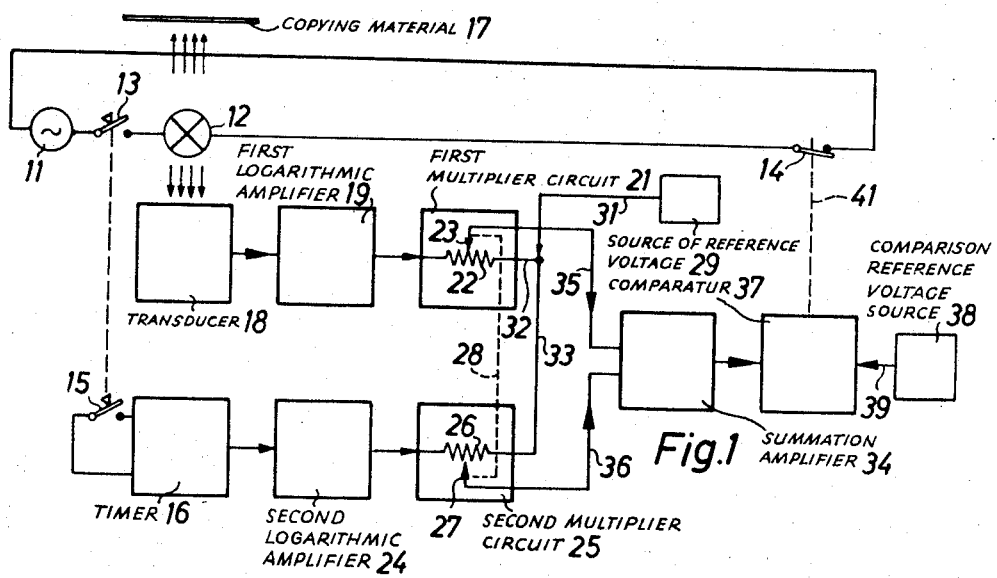
FIG. 1 is a block diagram of an embodiment of the exposure regulating device of the present invention for a copying machine.

The circuit arrangement of FIG. 1 regulates the exposure time of a copying machine. In FIG. 1, a source 11 of AC voltage is connected to and energizes a light source 12 via an input switch 13 and an output switch 14. The input switch 13 is mechanically coupled with and moves with a timer switch 15 which is connected in the circuit of a timer or clock 16.

The light source 12 illuminates the copying material 17 and a light-to-electricity transducer or light-responsive device 18 such as, for example, a secondary electron multiplier. The transducer 18 produces an electrical current I which has a magnitude corresponding to the intensity of light impinging upon said transducer. The current I is fed to a first logarithmic amplifier 19. The current amplified by the first logarithmic amplifier 19 is fed to a first multiplier circuit 21 which multiplies said current by a variable multiplier or coefficient A. The first multiplier circuit 21 includes a potentiometer 22 having a slide contact 23 which controls the variation of the multiplier A.

A second logarithmic amplifier 24 is connected to the output of the timer 16 and amplifies the time signal produced by said timer. The signal amplified by the second logarithmic amplifier 24 is fed to a second multiplier circuit 25 which multiplies said signal by a variable multiplier or coefficient B. The second multiplier circuit 25 includes a potentiometer 26 having a slide contact 27 which controls the variation of the multiplier B. The slide contacts 23 and 27 are mechanically coupled to each other by a mechanical linkage 28 in such a manner that in the equation (2) $\quad A/B=P$ B is maintained at zero and A is varied from zero to one, then A is maintained at one and B is varied from one to zero.

The Schwarzschild effect is defined by the equation (3) $\quad A \log I + B \log t = \text{Constant}$ which is a transformation of Equation 1, wherein $A/B=P$ In accordance with the present invention, Equation 3 is solved by a simple analog computer which may be economically included in the copying machine. The exponent P may vary between zero and infinity without decreasing the linearity of the characteristic of the double logarithmic regulation. The characteristic of the double logarithmic regulation may, on the other hand, be selected so that it deviates from linearity. This may be achieved by adjusting the characteristic to the block curve of a radiation sensitive material which deviates considerably from linearity.

If $A=0$, then $P=0$, and the copying machine operates with a fixed copying or exposure time which is not influenced by the density of the copying material 17. If $B=0$, then $P=$infinity, and the exposure time regulating circuit arrangement functions as a density discriminator in which the slope center point at the intersection of the characteristic varies from an exposure time of zero, when the density is less than the standard density, to an exposure time of infinity.

In order to satisfy Equation 3, when a sum alone is greater than the constant, the other sum must be a negative magnitude. Due to the directional characterisic of the logarithmic amplifiers 19 and 24, only unipolar signals are provided. A source of reference voltage 29 applies a reference voltage to the potentiometer 22 of the first multiplier circuit 21 via leads 31 and 32 and to the potentiometer 26 of the second multiplier circuit 25 via leads 31 and 33. The output voltages of the first and second logarithmic amplifiers 19 and 24 are of smaller magnitude than the magnitude of the reference voltage so that they are negative relative to said reference voltage. This thus provides the effect of a coordinate transformation in the characteristic of the double logarithm scale.

The slide contacts 23 and 27 of the potentiometers 22 and 26, respectively, are connected to the inputs of a summation amplifier 34 via leads 35 and 36, respectively. The output of the summation amplifier 34 is connected to an input of a comparator 37. A comparison reference voltage Vc is applied to another input of the comparator 37 from a comparison reference voltage source 38 via a lead 39. The comparison reference voltage Vc corresponds to the light sensitivity of the copying material 17. The comparison reference voltage source 38 may comprise, for example, a voltage divider. The comparator 37 is mechanically coupled to the output switch 14 by a mechanical linkage 41. When the output voltage of the summation amplifier 34 and the comparison reference voltage Vc reach a predetermined ratio relative to each other such as, for example, when the summation amplifier output voltage and the comparison reference voltage Vc are equal in magnitude, the comparator 37 functions to determine the ratio of such voltages and to open the output switch 14 to thereby terminate the exposure time by opening the circuit of the light source on lamp 12.

The exposure regulating circuit arrangement of FIG. 1 commences operation when the input switch 13 and the output switch 14 are each closed. When the switches 13 and 14 are closed, the lamp 12 is energized by the source 11 of AC voltage and starts the exposure, so that the exposure time commences at that instant. When the input switch 13 is closed, it closes the timer switch 15 and thereby initiates the operation of the timer 16. When the timer 16 is in operation, it supplies a linearly time-dependent signal to the second logarithmic amplifier 24. The time-dependent signal increases or decreases from zero in linear dependency upon time. The second logarithmic amplifier 24 amplifies the time signal logarithmically and supplies it to the second multiplier circuit 25. The second multiplier circuit 25 multiplies the logarithmically amplified time signal by the coefficient B and the resultant signal is supplied to the summation amplifier 34 via the potentiometer 26, the slide contact 27 and the lead 36.

The light produced by the lamp 12 is constant in intensity and impinges upon the light to electricity transducer 18 which produces a constant magnitude current I corresponding to the intensity of the light. The current I is supplied to the first logarithmic amplifier 19, which amplifies said current logarithmically and supplies it to the first multiplier circuit 21. The first multiplier circuit 21 multiplies the logarithmically amplified light intensity signal, or current I, by the coefficient A and the resultant signal is supplied to the summation amplifier 34 via the potentiometer 22, the slide contact 23 and the lead 35.

The summation amplifier 34 adds the resultant signal supplied by the first multiplier circuit 21 to the resultant signal supplied by the second multiplier circuit 25 and produces the resultant sum signal. The resultant sum signal produced by the summation amplifier 34 is supplied to the comparator 37 wherein it is compared with the comparison reference voltage Vc supplied by the comparison reference voltage source 38. When the predetermined ratio of the resultant sum voltage and the comparison reference voltage Vc occurs, the comparator 37 opens the output switch 14 and thereby terminates the exposure.

When the switches 13, 14 and 15 are closed, the exposure regulating circuit arrangement of FIG. 1 is in condition for a new exposure regulation.

Figure 2:
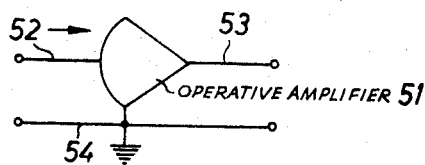
FIG. 2 is a symbol for an operational amplifier.

The exposure regulating circuit arrangement primarily comprises several operational amplifiers which differ in function because of different feedback paths. An operational amplifier is known for its utilization in an analog computer and is symbolized by a circle sector symbol 51, as shown in FIG. 2. The operative amplifier 51 usually has at least one input 52, one output 53 and a source 54 of DC. The operation or function of the operational amplifier 51 is determined by the feedback path connected from the output 53 to the input 52.

Figure 3:
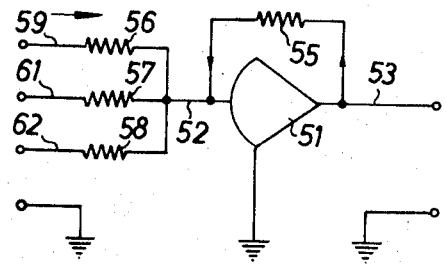
FIG. 3 is a basic circuit diagram of an embodiment of a summation amplifier circuit utilizing an operational amplifier.

FIG. 3 illustrates an operative amplifier circuit which functions as a summation amplifier and may therefore be utilized as the summation amplifier 34 of FIG. 1. A resistor 55 is connected between the output 53 and the input 52 and functions as the feedback path. Three resistors 56, 57 and 58, respectively, are connected in common to the input 52 via parallel leads 59, 61 and 62, respectively. The voltage produced at the output 53 is proportional to the sum of the voltages of the three leads 59, 61 and 62 when the resistors 56, 57 and 58 are equal in resistance. If the resistance values of the resistors 56, 57 and 58 are not equal, then the voltage of each of the leads 59, 61 and 62 is inversely proportional to the resistance value of its resistor 56, 57 and 58, respectively, and is so added into the resultant sum voltage.

Figure 4:
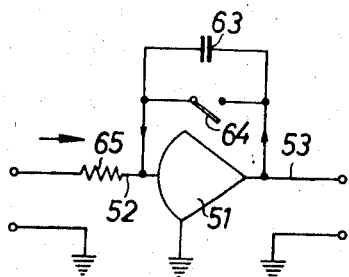
FIG. 4 is a basic circuit diagram of an embodiment of an integrator circuit utilizing an operational amplifier.

FIG. 4 illustrates an operational amplifier circuit which functions as an integrator and may therefore be utilized as the timer or clock 16 of FIG. 1, if it integrates a constant input signal. A capacitor 63 is connected between the output 53 and the input 52 and functions as the feedback path. The capacitor 63 charges during the exposure time and discharges rapidly via a discharge switch 64, connected in parallel with said capacitor between the output 53 and the input 52, upon the termination of the exposure time. An input resistor 65 is connected in the input 52. The voltage produced at the output 53 is proportional to the period of the input voltage of the input 52.

Figure 5:
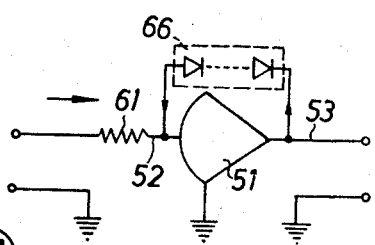
FIG. 5 is a basic circuit diagram of an embodiment of a logarithmic amplifier circuit utilizing an operational amplifier.

FIG. 5 illustrates an operative amplifier circuit which functions as a logarithmic amplifier and may therefore be utilized as the first logarithmic amplifier 19 and as the second logarithmic amplifier 24. One or several diodes 66 are connected between the output 53 and the input 52 and function as the feedback path. An input resistor 61 is connected in the input 52. The diodes 66 are connected in series with the cathode of an end diode connected to the output 53, with the anode of such end diode connected to the cathode of the next adjacent diode and so on, and with the anode of the other end diode connected to the input 52. The diodes 66 have a linear characteristic in the working range of the logarithmic scale and function as a block. The voltage produced at the output 53 is proportional to the logarithm of the input current of the input 52.

Figure 6:
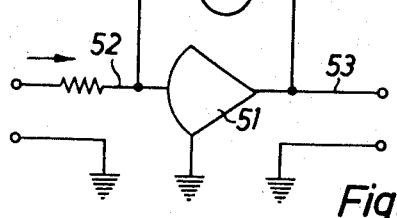
FIG. 6 is a modification of FIG. 5.

The circuit of FIG. 5 may be modified by substituting an NPN type transistor for the diodes 66. The emitter-collector path of the transistor is then connected between the output and input of the operative amplifier 51 and the base electrode is connected to the collector electrode. The modified circuit operates as a logarithmic amplifier and is shown in FIG. 6.

Figure 7:
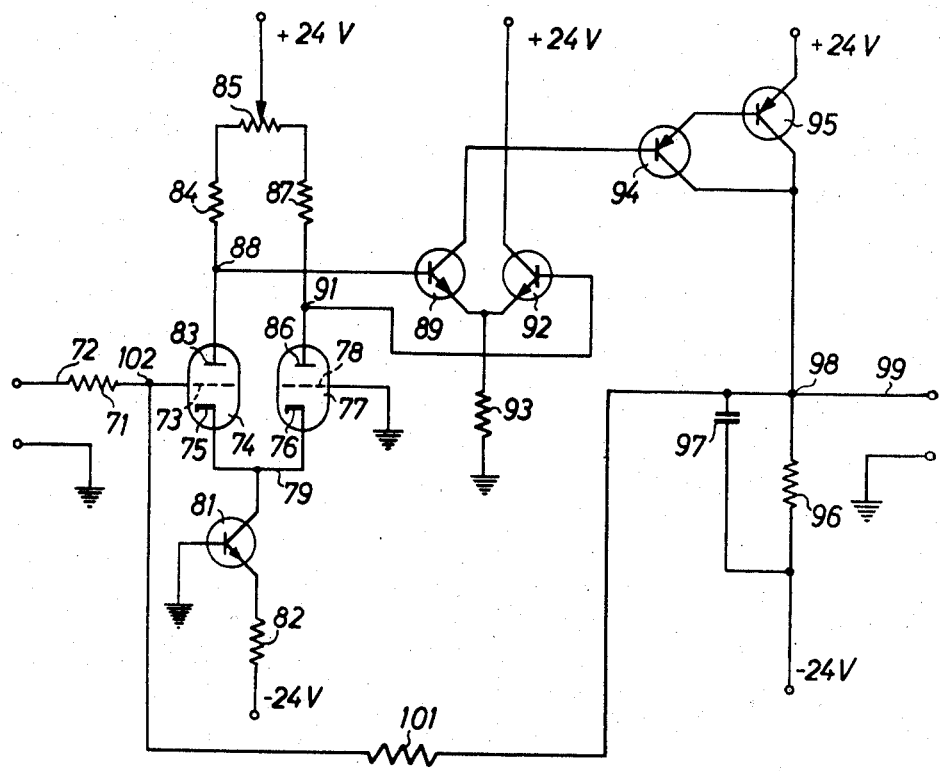
FIG. 7 is a circuit diagram of an embodiment of an operational amplifier.

Although operational amplifiers are well known in the art of analog computers and are commercially available as circuit components, FIG. 7 illustrates a simple amplifier circuit which may be utilized as an operational amplifier. An input resistor 71 is connected in the input 72 in series with the grid 73 of a first amplifier tube 74. The cathode 75 of the first amplifier tube 74 is directly connected to the cathode 76 of a parallel-connected second amplifier tube 77. The grid 78 of the second amplifier tube 77 is connected to a point at ground potential.

The common cathode connection 79, and therefore the cathodes 75 and 76, of the first and second amplifier tubes 74 and 77 is connected to the collector electrodes of a first transistor 81. The base electrode of the first transistor 81 is connected to a point at ground potential and its emitter electrode is connected to a source of −24 volts via an emitter resistor 82. The anode 83 of the first amplifier tube 74 is connected to a source of +24 volts via an anode resistor 84 and a portion of a common anode resistor 85. The anode 86 of the second amplifier tube 77 is connected to the same source of +24 volts via an anode resistor 87 and the remaining portion of the common anode resistor 85. The anode resistors 84, 85 and 87 are connected in series between the anodes 83 and 86.

A common point 88 in the connection between the anode 83 and the anode resistor 84 is connected to the base electrode of a second transistor 89. A common point 91 in the connection between the anode 86 and the anode resistor 87 is connected to the base electrode of a third transistor 92. The second and third transistors 89 and 92 are connected to function as a differential amplifier, with their emitter electrodes connected in common and to a point at ground potential via an emitter resistor 93. The collector electrode of the third transistor 92 is connected to a source of +24 volts. The collector electrode of the second transistor is connected to the base electrodes of a fourth transistor 94.

The fourth transistor 94 functions as an amplifier and its emitter electrode is connected to the base electrode of a fifth transistor 95 which also functions as an amplifier. The emitter electrode of the fifth transistor 95 is connected to a source of +24 volts. The collector electrodes of the fourth and fifth transistors 94 and 95 are connected in common and to a source of −24 volts via a collector resistor 96. A capacitor 97 is connected in parallel with the collector resistor 96. A common point 98 in the connection between the collector resistor 96 and the collector electrodes of the fourth and fifth transistors is connected to the output 99 at which the amplifier output voltage is provided and is also connected, via a feedback resistor 101 to a common point 102 in the input 72 in the connection between the input resistor 71 and the grid 73 of the first amplifier tube 74.

Each of the components of the circuit arrangement of FIG. 1 may comprise any suitable known circuitry or apparatus.

While the invention has been described by means of a specific example and in a specific embodiment, I do not wish to be limited thereto, for obvious modifications will occur to those skilled in the art without departing from the spirit and scope of the invention.

What I claim is:

1. An exposure time regulating circuit arrangement for regulating the exposure time during exposure of copying material, comprising means for exposing said copying material to light;

transducer means positioned in the light impinging upon said copying material for producing an electrical signal corresponding in magnitude to the intensity of said light;

timer means for producing a time dependent electrical signal;

actuating means connected to said timer means for actuating said timer means upon the exposure of said copying material to said light;

first logarithmic amplifier means connected to said transducer means for logarithmically amplifying the signal produced by said transducer means;

second logarithmic amplifier means connected to said timer means for logarithmically amplifying the signal produced by said timer means;

first multiplier means connected to said first logarithmic amplifier means for multiplying the signal amplified by said first logarithmic amplifier by a first coefficient to produce a first resultant signal;

second multiplier means connected to said second logarithmic amplifier means for multiplying the signal amplified by said second logarithmic amplifier by a second coefficient different from said first coefficient to produce a second resultant signal;

summation means connected to said first and second multiplier means for adding said first and second resultant signals to produce a resultant sum signal; and control means connected to said summation means for terminating the exposure of said copying material in accordance with the magnitude of said resultant sum signal.

2. An exposure time regulating circuit arrangement as claimed in claim 1, wherein said control means includes comparator means and a source of comparison reference voltage connected to said comparator means for applying a comparison reference voltage to said comparator means, said comparator means comparing said resultant sum signal with said comparison reference voltage.

3. An exposure time regulating circuit arrangement as claimed in claim 2, wherein said means for exposing said copying material to light comprises a light source and an electrical energizing circuit connected to said light source for energizing said light source to produce light, and wherein said comparator means is coupled to said energizing circuit for deenergizing said energizing circuit to terminate the production of light by said light source.

4. An exposure time regulating circuit arrangement as claimed in claim 1 wherein each of said first and second logarithmic amplifier means comprises an operational amplifier having an output, an input and a feedback path between said output and input, and diode means connected in said feedback path.

5. An exposure time regulating circuit arrangement as claimed in claim 1, wherein said summation means comprises an operational amplifier having an output, an input and a feedback path between said output and input, and wherein said timer means comprises an operational amplifier having an output, an input and a feedback path between said output and input, and a first feedback component connected in the feedback path of said summation means and a second feedback component different from said first feedback component connected in the feedback path of said timer means.

6. An exposure time regulating circuit arrangement as claimed in claim 1, wherein each of said first and second logarithmic amplifier means comprises an operational amplifier having an output, and input and a feedback path between said output and input, and an NPN type transistor having an emitter-collector path connected in said feedback path, a collector electrode and a base electrode connected to said collector electrode.

7. An exposure time regulating arrangement as claimed in claim 1, wherein said time dependent signal is linearly dependent on time.

8. An exposure time regulating arrangement as claimed in claim 1, wherein said electrical signal corresponding in magnitude to the intensity of light is constant in magnitude.

9. An exposure time regulating arrangement as claimed in claim 1, wherein said first coefficient has a predetermined ratio to said second coefficient.

References Cited

UNITED STATES PATENTS

| | | | |
|---|---|---|---|
| 3,011,395 | 12/1961 | Folse | 88—24 |
| 3,074,312 | 1/1963 | Olson | 88—24 |
| 3,293,424 | 12/1966 | Fisher | 235—194 |
| 3,333,185 | 7/1967 | Riseman et al. | 235—193 XR |
| 3,342,984 | 9/1967 | Gray et al. | 235—193 XR |

NORTON ANSHER, *Primary Examiner.*

F. L. BRAUN, *Assistant Examiner.*

U.S. Cl. X.R.

235—193; 355—83